United States Patent [19]

Baecker et al.

[11] Patent Number: 4,532,617
[45] Date of Patent: Jul. 30, 1985

[54] SYSTEM FOR LOCATING A TOWED MARINE OBJECT

[76] Inventors: Donald R. Baecker, 6002 Cerritos, Houston, Tex. 77035; Joseph V. Bijou, 5801 Clarewood #44, Houston, Tex. 77081

[21] Appl. No.: 428,320

[22] Filed: Sep. 29, 1982

[51] Int. Cl.³ ............................................. G01V 1/38
[52] U.S. Cl. ............................... 367/19; 367/6; 367/106
[58] Field of Search ................. 367/6, 19, 106, 902

[56] References Cited

U.S. PATENT DOCUMENTS

| | | | |
|---|---|---|---|
| 3,439,319 | 4/1969 | Whitfill | 367/19 |
| 3,581,275 | 5/1971 | Hedberg | 340/953 |
| 3,906,352 | 9/1975 | Parker | 372/74 |
| 3,953,827 | 4/1976 | Moal et al. | 367/19 |
| 4,087,780 | 5/1978 | Itria et al. | 367/17 |
| 4,254,478 | 3/1981 | Dumas | 367/902 X |
| 4,388,710 | 6/1983 | Pecon, Jr. | 367/6 X |
| 4,446,538 | 5/1984 | Zachariadis | 367/19 |

FOREIGN PATENT DOCUMENTS

| | | |
|---|---|---|
| 1090428 | 11/1967 | United Kingdom . |
| 1394533 | 5/1975 | United Kingdom . |
| 1571138 | 7/1980 | United Kingdom . |
| 2089043 | 6/1982 | United Kingdom . |
| 2116716 | 9/1983 | United Kingdom . |

*Primary Examiner*—Richard A. Farley
*Attorney, Agent, or Firm*—Kenneth H. Johnson

[57] ABSTRACT

A system and method for determining the position of towed marine object relative to a towing vessel. The system comprises a towing vessel, a slave vessel, and the towed object. An acoustic transceiver is located on either the towing vessel or the slave vessel with an acoustic receiver located on the other vessel. One or more acoustic transponders are associated with the towed object. The distance between the towing vessel and the slave vessel is determined, for example, by radio navigation which is calibrated by a high precision range-range system. The acoustic transmitter emits an interrogation signal which causes the transducer(s) to emit a response acoustic signal which is recorded at the two receivers. Using the time for the response signal to reach each of the receivers and the velocity of sound in water, the distance of the transducer from each vessel is calculated. With the three distances the location of the transducer relative to the towing vessel is determined by trilateration. The system is especially useful for determining the horizontal profile of a towed seismic cable, where a series of transducers are located along the cable. The interrogation signal will interrogate each transducer sequentially and by trilateration of each transducer a very accurate representation of the horizontal profile is obtained.

17 Claims, 3 Drawing Figures

SYSTEM FOR LOCATING A TOWED MARINE OBJECT

BACKGROUND OF THE INVENTION

1. Field of the Invention

The present invention relates to a system and method for determining the location of a towed marine object relative to the towing vessel. More particularly, the present invention relates to a system and method for determining the horizontal profile of a towed seismic marine cable.

2. Related Art

The search for hydrocarbons is being widely pursed, including water covered areas of high potential. Much of the water covered area is unexplored and little is known of the structural configuration of the covered formation.

In conducting marine seismic exploration, a long seismic cable (called a streamer) is conventionally towed behind a vessel. These cables generally carry detector apparatus such as seismic transducers or hydrophones which detect reflected wave energy and provided signals representative thereof, from a sound source such as dynamite which introduces an acoustical wave front into the earth formation underlying the body of water being explored. The hydrophones pick up seismic waves reflected from the geological structures in the underlying formation.

The cables are typically several thousand feet long, e.g., up to several miles and comprise sections of cable coupled together end to end. Usually each section will carry one or more seismic transducer or hydrophone devices. The cables are usually constructed having a neutral buoyancy, and various systems have been developed for determining the vertical profile of the cable, e.g., U.S. Pat. No. 3,439,319.

A problem which has not been overcome, although different approaches have been made, is the configuration of the streamer in the water as it is towed, i.e., the horizontal profile of the cable. Currents, wake and the like, cause the cable to move over an unpredictable path over the geological formation being surveyed. Thus the location of any given seismic device at the time it receives a reflected sound is not accurately known.

The general practice is to assume the cable lies in a straight line behind the towing vessel. This is probably rarely the case. To compensate for this inaccuracy, three dimensional surveys are sometimes employed. Such a system is shown in U.S. Pat. No. 3,906,352.

One system for attempting to locate horizontal angular position of a towed seismic cable is described in U.S. Pat. No. 3,953,827, which measures the angle between the tangent to the cable and a measuring device and a fixed and known direction, using an optimized curve of the cable and the space between measuring devices, to obtain the position in space of the measuring devices and interpolating the location of the seismic device along the curve. The system lacks accuracy since it is based on assumptions as to the horizontal profile of the cable.

It is an advantage of the present invention that the location of a towed marine object relative to the towing vessel can be accurately determined. It is a particular advantage that an accurate profile of the horizontal configuration of a towed seismic cable can be determined. It is a further advantage of the present invention that a method of continuous profiling of the seismic cable is provided.

SUMMARY OF THE INVENTION

The present system for locating a towed marine object, relative to a towing vessel (horizontal position) comprises a towing vessel (master vessel) having an acoustic transmitter thereon for emitting a first acoustic signal, an acoustic receiver thereon for receiving a second acoustic signal, a radio means for receiving information from a slave vessel, a towed object connected to said towing vessel and having at least one acoustic transponder associated therewith for interrogation by said first acoustic signal to emit a second (response) acoustic signal; a slave vessel spaced a known distance and position abeam of said towing vessel, having an acoustic receiver thereof for receiving said first acoustic signal and said second acoustic signal and having radio telemetry means for transmitting acoustic signal information to said towing vessel; and means for synchronizing said acoustic receivers on said slave vessel and said towing vessel. The acoustic signals are emitted into the marine body.

In its broadest aspect the present invention can be used to locate any towed object such as side scan sonar, a buoy or the like, relative to the towing vessel where only one transponder may be employed. In one specific embodiment relating to a seismic cable, a plurality of transponders are located along the towed cable and are interrogated sequentially along the cable away from the towing vessel.

Preferably, if there is more than one transponder associated with the towed object, each transponder will emit a pulse or signal at a different frequency (from each other and also the interrogating signal) so that the transponder is identified not only by the sequence of the pulse but by the frequency.

The position of each towed transponder is determined by acoustic range trilateration. The slave vessel is positioned abeam and preferably astern of the towing vessel.

The exact location (horizontal position) of the slave vessel relative to towing vessel (also called the master vessel) is determined by use of the same radio positioning system, such as Argo, Syledis or the like for both vessels. This is an entirely conventional radio navigation procedure. Any systematic errors existing between the master and slave are removed by high precision range-range system, such as the Autotape System (Cubic Western Company) which is a range-range micro-wave propagational position system, which is accurate to within about ±10 centimeters. This range between the master and slave forms the base line of the trilateration and also provides the range used to calibrate the velocity of sound in water so that any acoustic velocity changes may be continuously corrected.

The master emits an acoustic signal (pulse) which activates (interrogates) each acoustic transponder along the cable, and each transponder will then emit a signal (pulse) which both the master and slave acoustic receiver will pick up. Using the time interval for the first signal emitted by the master and the velocity of sound in water (calibrated for the specific water in use) the range, i.e., distance from the master and slave to each transponder can be calculated with great accuracy.

The timing chain on the slave is synchronized with that of the master, that is, the master vessel actuates its own acoustic receiver and that on the slave vessel such that both receivers have the same time, i.e., the time when the first acoustic signal is emitted to interrogate the transponder(s). This is conveniently done by radio telemetry in the same manner as information about the acoustic signals are transmitted from the slave to the master.

The slave transmits its information (time of acoustic signal reception and navigational information) to the master where the calculation for calibration and ranges are conveniently made by computer. A continuous visual display and/or record of the horizontal profile of the cable can be presented to be correlated with the seismic information recieved by the seismic devices. Hence an extremely accurate seismic record is produced of the underwater structures. The present system can be employed with a single towed object (seismic cable) or with multiple towed objects such as the parallel cables used for three dimensional seismic profiles. However, in many instances the improved accuracy of the present system may eliminate the need for the more costly three dimensional surveys.

Although the invention is described as having the towing vessel as the master vessel, either vessel may be the master vessel and the other vessel the slave.

The invention will be more fully understood from the following description of the drawings.

DETAILED DESCRIPTION OF THE INVENTION

Figure 1:
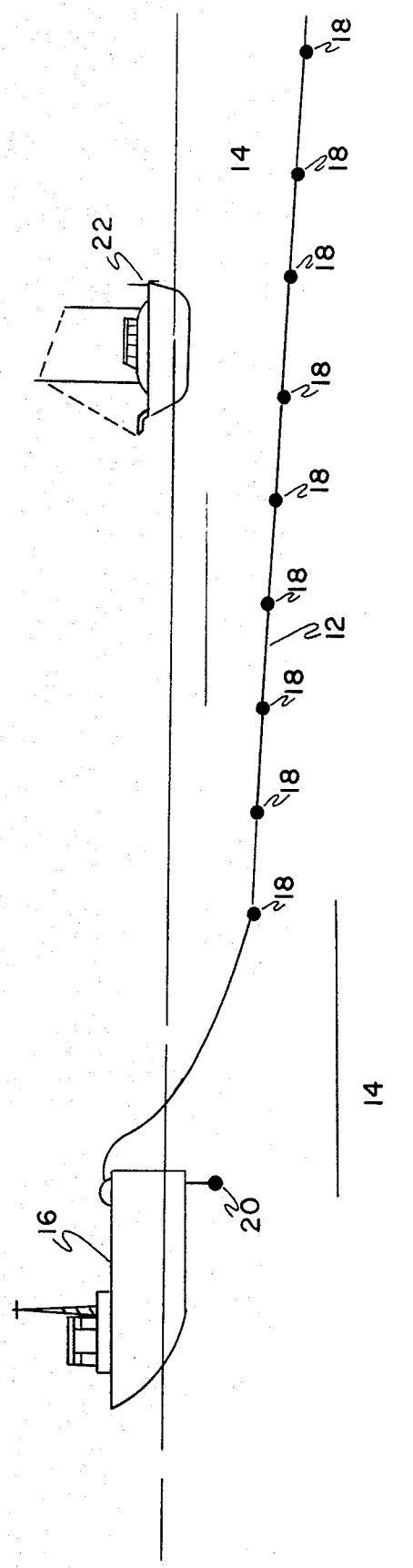
FIG. 1 is an elevational view of a schematic representation of the marine components of the present system.

In FIG. 1 a seismic cable 12 is shown disposed in the water 14 behind towing vessel 16 with transponders 18 disposed therealong. An acoustic transmitter-receiver such as Model ART-285 Acoustic Ranging Transceiver (Datasonics, Inc., Cataumet, Mass.) is mounted to the towing vessel. A slave vessel 22 is positioned abeam and astern of the towing vessel one to two miles from the cable 14 at approximately the middle of the cable. The slave vessel 22 is depicted as a sail boat since such vessels have excellent stability although it is contemplated power will be used to maintain the slave vessel in its position. Although it is preferred that the slave vessel be independently powered, it could be remotely controlled from the towing vessel or even towed.

Figures 2, 3:
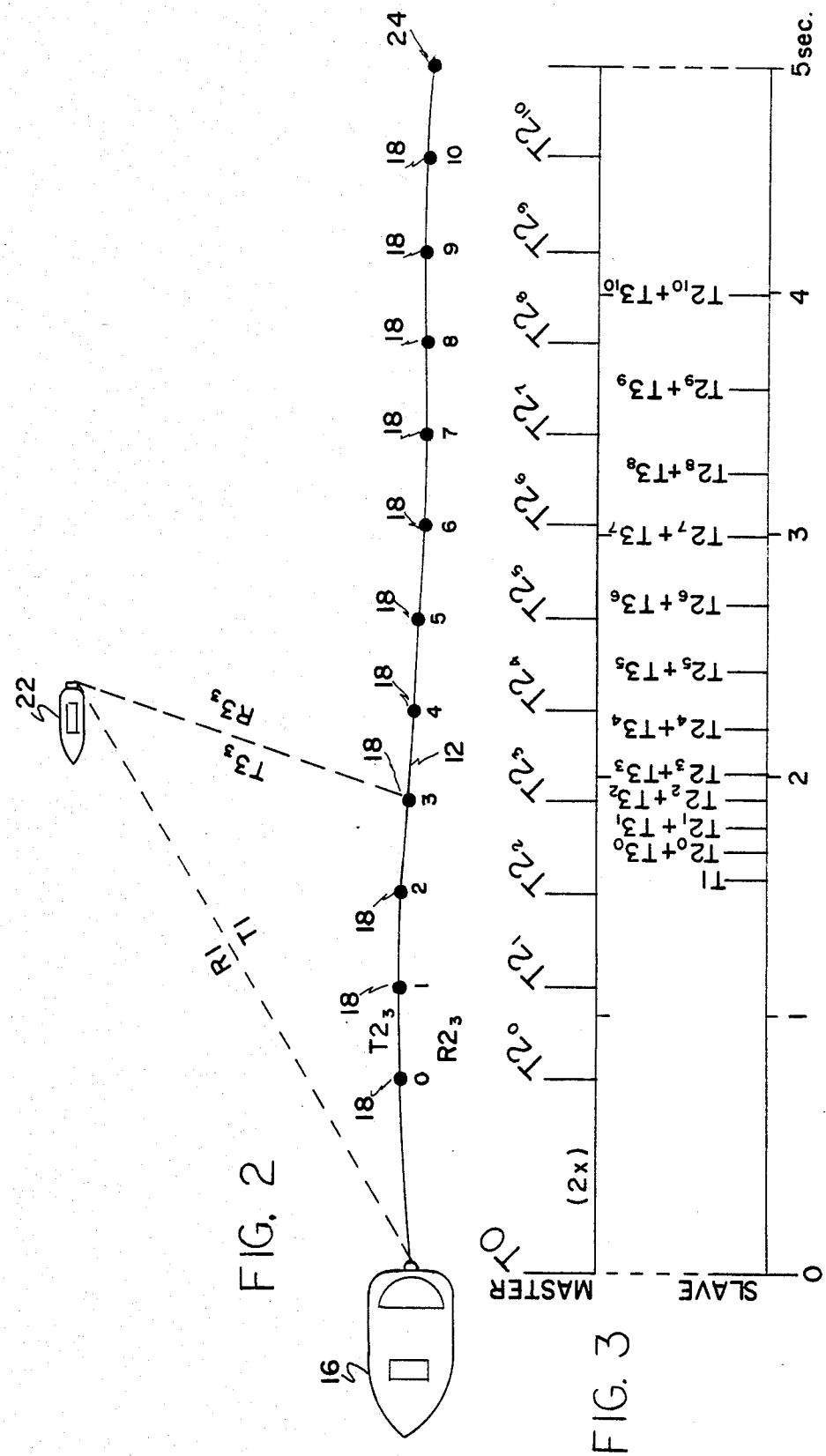
FIG. 2 is a top view of a schematic representation of the marine components of the present invention.
FIG. 3 is proportional representation of the time related to various transponder signals to either the master or slave vessel.

FIG. 2 shows the towing vessel 16, the slave vessel 22, and a somewhat extended cable 12 having eleven acoustic transponders 18 designated sequentially 0 to 10 such as Model ANT-388 Streamer Cable Acoustic Navigation Transponders (Datasonic, Inc.) spaced therealong. A tail buoy 24 is shown, which is useful to warn other vessels and to recover the cable should it become separated from the towing vessel.

The position of the slave vessel 22 relative to the towing vessel has been determined by using the same radio navigational system to locate their positions. Although these systems are very accurate for navigational purposes, exactness within a few meters is more than adequate for their intended purpose. Hence, it is desirable to verify or calibrate the navigational system for the present use. This is readily achieved by any of several available range-range methods used for exact range determinations. The accurate determination of the slave ship relative to the master is not a part of the present invention and may be obtained by known conventional systems.

A specific system which gives accuracy within ±10 centimeters is a microwave propagational system available from Cubic Western Company under the name Autotape. Briefly, this system employs two transponders on the towing vessel and a single master transponder on the slave vessel. The distance between the two transponders on the towing vessel ($Dist_{12}$) is known. The distance between each of these transponders and the master transponder ($Dist_1$ and $Dist_2$ respectively) is determined. With these distances now known the angle $\phi$ (the angle between the base line of the two transponders on the towing vessel and $Dist_1$ can be determined using the equation:

$$\phi + \arccos = \frac{Dist_{12}^2 + Dist_1^2 - Dist_2^2}{2\ Dist_1\ Dist_{12}}$$

Knowing the angle $\phi$, the range or distance determined from the radio navigation system can be compared to that from the range-range determination and the navigation calibrated from the more accurate range-range system, if necessary. Any system which has a greater accuracy than the radio navigation system can be used and the more accurate the better. At present, available laser equipment which would give the greatest degree of accuracy is not developed for use on the unstable and moving platform provided by a vessel at sea (the beam is too narrow and difficult to accurately spot.) However it is contemplated that such a system, when this problem is solved, would be excellent for the calibration.

When the range (distance) $T_1$ between the master 16 and slave 22 has been determined this serves as a base line and is one side of the triangle used for the trilateration.

There are various methods for determining the velocity of sound in sea water, however, because of the accurately measured distance $T_1$, this velocity is accurately and continuously determinable for the marine system in which the present system is being employed.

The system of the present invention is operated by an acoustic pulse or signal using a device such as Model AT-490 Interrogation Transducer (Datasonics, Inc.) from the towing (master)vessel 16, which interrogates each acoustic transponder 18 (0-10) in sequence (0-10) because of the sequential arrangement of the transponders along the cable. Each transponder then emits an acoustic signal or pulse, which is preferably on a different designated frequency from the other transponders.

Both the master vessel 16 and the slave vessel are equipped with acoustic receivers (such as the Model ART285, note the slave needs only receiver capability), to receive the acoustic signals from the transponders 18. The slave vessel also receives the signal from the master vessel. The acoustic information received by the slave vessel is transmitted by radio frequency to the master vessel. With the information collected from the acoustic signals the accurate calculation of the ranges (distances) R2 and R3 for each transponder 18 is easily made using the equations $$Vs = \frac{R1}{T1}$$

$$R2 = \frac{T2}{2} \times Vs$$

$$R3 = T3 \times Vs$$

where

T1 = Time one way from master to slave

T2 = Time both ways from master to each of the designated transponders

T3 = Time one way from the corresponding transponder to the slave (determined by subtracting T2/2 from the time elapsed from the transmission of the master signal until reception of the response signal of the designated transponder at the slave).

R1 = Range from the master to the slave (Determined by Range-Range)

R2 = Range from the master to each of the selected transponders

R3 = Range from the slave to the corresponding transponder

Vs = Velocity of sound in sea water

Conveniently the calculations are made by computer and graphically displayed in a continuous manner and or recorded for evaluation in conjunction with the seismic record.

It should be appreciated that R1 is the same as the base line determined as described above and velocity of sound in water is determined by using the known R1 and the time elapsed between emission of the master signal and its reception by slave.

In FIG. 2 the relationship of one transponder 18 (3) is depicted. The time T2 is shown as T2$_3$ and the range as R2$_3$ which is the time and distance of transponder 18 (3) to the master vessel 16. The time T3 is shown as T3$_3$ and the range R3 as R3$_3$ which is the time and distance of transponder 18 (3) to the slave vessel 22. The time T1 and range R1 are employed as a constant for a particular cable location series. This is possible since the entire procedure once the master vessel has emitted the interrogating signal takes only about 4 to 6 seconds, thus the relative position of the two vessels has not had time to change any significant amount.

When each transponder 18 and the master vessel transmitter emit different and designated frequencies, the receiver on the master and slave vessels are adapted to distinguish between the frequencies and correlate the times T1, T2 and T3 with the designated transponder.

In the event that different and distinct signals are not used for each of the signals then the slave vessel receiver is adapted to recognize the first signal as transmitted from the master, the second signal from transponder 18 (0), the third signal as from transponder 18 (1) and so forth; the master receiver will recognize the first signal as transmitted from transponder 18 (0), the second signal as from transponder 18 (1), the third signal as from transponder 18 (2) and so forth. The transmitter and receiver equipment as well as the acoustic transponder are all conventional and other than their combination in the present invention are not a part thereof. Similarly the computer equipment is conventional and the program, if any, for carrying out the equation and the graphic presentation, if desired, of the cable configuration readily within the skill of those in the art.

In FIG. 3, the time sequence of an operational sequence of the embodiment of FIG. 2 is graphically presented. FIG. 3 shows in graphic and proportional representation the sequence of acoustic signal reception from the transponders 18 (0–10) by the master vessel receiver and the slave vessel receiver for a cable about two miles long with the transponders 18 spaced substantially equidistance apart. The entire sequence from emission of the master interrogation signal is less than 5 seconds (assuming a velocity of sound in water of approximately 4,855 feet/sec.)

The designation T0 (T zero) is the initiation of the sequence and corresponds to the emission of the interrogating signal by the master. The acoustic receivers on the master and the slave vessels are synchronized via radio telemetry so that both are timing from the same zero point (T0) in the sequence. In FIG. 3 the time of the acoustic signals is shown for each of the transponders (the subscripts representing the 0–10 transponders of FIG. 2. T2 the time from T0 until the master receives the signal from the transponder actually is the time for the interrogating signal to reach the transponder and for the reply signal from the transponder to return to the master hence the time one way is T2/2.

The process of locating position of a towed object such as the seismic cable can be repeated as soon as the preceding sequence has ended, i.e., possibly every 6 seconds or so if desired. Similarly the process may be adjusted to whatever interval is determined to provide the location information desired or to conserve the batteries on the transponders or the like.

The invention claimed is:

1. A system for locating a towed marine object relative to a towing vessel comprising:
   (a) a towing vessel;
   (b) a slave vessel spaced a known distance and positioned abeam of said towing vessel;
   (c) a towed object connected to said towing vessel and having at least one acoustic transponder means associated therewith for interrogation by a first acoustic signal to cause said transponder means to emit a response acoustic signal;
   (d) an acoustic transmitter-receiver located on a first one of said vessels for emitting said first acoustic signal and receiving said response signal;
   (e) an acoustic receiver located on a second of said vessels for receiving said first and response acoustic signals;
   (f) means for synchronizing said acoustic receivers; and
   (g) means to transmit acoustic signal information from said second vessel to said first vessel.

2. The system according to claim 1 wherein said first vessel is said towing vessel and said second vessel is said slave vessel.

3. The system according to claim 1 wherein said acoustic transponder means emits said response signal at a different frequency than said first signal.

4. The system according to claim 1 wherein a plurality of acoustic transponder means are associated with the towed object.

5. The system according to claim 4 wherein each acoustic transponder means emits said response signal at a different frequency than every other acoustic transponder and said first signal.

6. The system according to claim 1 wherein said slave vessel is astern of said towing vessel.

7. The system according to claim 1 wherein said means for synchronizing said acoustic receivers is by radio telemetry.

8. The system according to claim 1 wherein means to transmit acoustic signal information from said second vessel to said first vessel is by radio telemetry.

9. The system according to claim 4 wherein the towed object is a seismic cable.

10. The system according to claim 5 wherein the towed object is a seismic cable.

11. The system according to claim 10 wherein said acoustic transponders are spaced approximately equidistance apart along said seismic cable.

12. The system according to claim 1 wherein said slave vessel is towed by said towing vessel.

13. The system according to claim 1 wherein said slave vessel is remotely controlled from said towing vessel.

14. The system according to claim 1 wherein said towing vessel, said slave vessel and towed object are moving.

15. A method for locating a towed marine object relative to a towing vessel comprising
(a) determining the navigation position of a towing vessel and a slave vessel abeam and spaced apart therefrom,
(b) determining the distance between said towing vessel and said slave vessel,
(c) emitting a first acoustic signal from a first one of said vessels,
(d) receiving said first signal at a second one of said vessels,
(e) recording the time elapsed from transmitting said first acoustic signal until reception by said second vessel,
(f) receiving said first signal at at least one acoustic transponder means associated with an object towed by said towing vessel, said acoustic transponder means being interrogated by said first signal to emit a response signal,
(g) receiving said response signal at said first vessel,
(h) recording the time elapsed from transmitting said first signal until reception of said response signal by said first vessel,
(i) receiving said response signal at said second vessel,
(j) recording the time elapsed from transmitting said first signal until reception of said response signal by said second vessel,
(k) determining the velocity of sound in water,
(l) calculating the distances between said first and second vessels and said acoustic transponder by the equations:

$$Vs = \frac{R1}{T1}$$

$$R2 = \frac{T2}{2} \times Vs$$

$$R3 = T3 \times Vs$$

wherein R1=the distance between said vessels,
R2=the distance between said first vessel and said transponder means,
R3=the distance between said second vessel and said transponder means,
T1=the time one way for said first acoustic signal to travel from said first vessel to said second vessel,
T2=the time for the first acoustic signal to travel to said transponder means plus the time for said response signal to travel to said first vessel,
T3=time for the first acoustic signal to travel to said transponder means plus the time for said response signal to travel to said second vessel less T2/2,
Vs=velocity of sound in water,
(m) trilaterating the R1, R2 and R3 thereby locating the position of said transponder relative to said towing vessel.

16. The method according to claim 15 wherein a series of acoustic transponder means are located along a cable towed by said towing vessel and each of steps (f) through (m) are repeated sequentially for each of said acoustic transponder means.

17. The method according to claim 16 wherein the sequence of acoustic transponder means is away from said towing vessel.

* * * * *